May 17, 1966 R. G. VELTROP 3,252,113

BROADBAND HYBRID DIPLEXER

Filed Aug. 20, 1962

INVENTOR.
ROBERT G. VELTROP

BY John F. Lawler

ATTORNEY

United States Patent Office 3,252,113
Patented May 17, 1966

3,252,113
BROADBAND HYBRID DIPLEXER

Robert G. Veltrop, Sunnyvale, Calif., assignor to Sylvania Electric Products Inc., a corporation of Delaware Filed Aug. 20, 1962, Ser. No. 218,027
2 Claims. (Cl. 333—10)

This invention relates to diplexer frequency branching networks and more particularly to a technique for extending the bandwidth of diplexer frequency branching networks.

Diplexer combining or frequency branching networks are employed in systems utilizing a single antenna for transmitting or receiving signals having different frequencies. Diplexers comprising filters connected between first and second hybrid couplers are commonly employed to accomplish the combining and/or separating of signals having different frequencies. Such diplexers suffer from the limitation that the bandwidth of the diplexer is limited to the bandwidth of the hybrids, that is, the frequency band over which there is equal power division of an input signal between two of the four terminals of the hybrid is limited by the hybrids.

It is the general object of this invention to provide a broad band diplexer frequency branching network employing hybrids having equal power division over only a portion of the bandwidth of the diplexer.

This and other objects of the invention are accomplished by the inclusion of a differential phase shifter between the filters and the second hybrid of a microwave hybrid-filter diplexer. This diplexer has first and second four port hybrid couplers with substantially indentical coupling characteristics and has filters with substantially identical filter characteristics. Each hybrid divides the power of an input signal into two equal parts over a portion of the diplexer bandwidth corresponding to the bandwidth of the hybrid and into two unequal parts over the remainder of the diplexer bandwidth.

Conventional hybrid-filter diplexers employ substantially identical filters to divide the bandwidth of the diplexer, equal to the half-power bandwidth of the hybrid, into two frequency bands such that an input signal whose frequency is within one band is reflected by the filters back into the first hybrid, and an input signal whose frequency is within the other band is passed by the filters to the second hybrid. Thus, the half-power bandwidth of the diplexer is divided equally between one port of the first hybrid and one port of the second hybrid.

The filters employed in a preferred embodiment of this invention are low-pass filters and have a cutoff frequency equal to the lower cutoff frequency of the half-power bandwidth of the hybrids. The filters reflect signals whose frequency is within the bandwidth or greater than the upper cutoff frequency of the bandwidth of the hybrids and pass signals whose frequency is below the lower cutoff frequency of the bandwidth of the hybrids. The signals reflected from the filters cancel in the input port and combine to produce an output in another port of the first hybrid. The direct and coupled signals passed by the filters are applied to a differential phase shifter that shifts the phase of the signal in one line approximately 180 degrees with respect to the phase of the signal in the other line such that the signal on the coupled line lags the signal on the direct line by substantially 90 degrees. The phase of the outputs of the differential phase shifter is such that the outputs combine in one port and cancel in the remaining port of the output hybrid to produce an output equal in magnitude but having a frequency outside the bandwidth of the hybrid.

This invention and its objects will be more fully understood from the following detailed description of a preferred embodiment thereof, reference being made to the accompanying drawing wherein.

Figure 1:
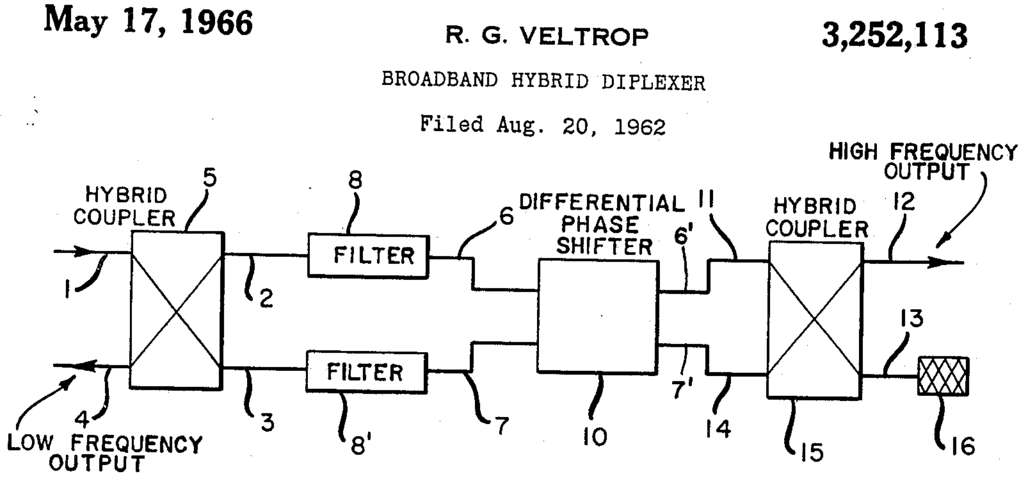
FIGURE 1 is a block diagram of a diplexer embodythis invention.
Figure 2:
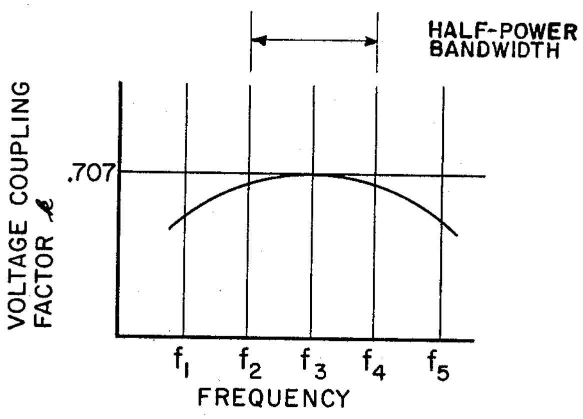
FIGURE 2 is a plot illustrating the coupling characteristics of the hybrid couplers of the diplexer.
Figure 3:
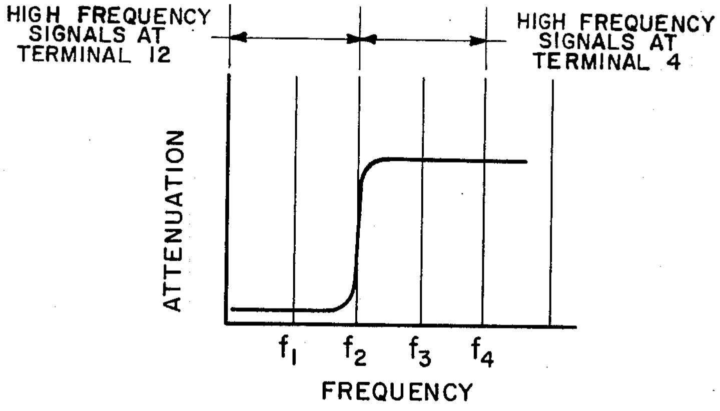
FIGURE 3 is a plot illustrating the filter characteristics of the filters of the diplexer.

Referring now to FIGURE 1, first and second hybrid couplers 5 and 15, respectively, are four port electromagnetic directional couplers of the type described in 1957 IRE Wescon Convention Record, Part 1, page 4, Strip-Line 3-db Directional Couplers, by James K. Shimizu. Couplers 5 and 15 have substantially identical coupling characteristics as shown in FIGURE 2 and each divides the signal power equally over a frequency range referred to herein as the coupler bandwidth. Pairs of ports 1, 4 and 2, 3 are located on opposite sides of first hybrid 5 and pairs of ports 11, 14 and 12, 13 are on opposite sides of hybrid 15. In the illustrated embodiment the signal is applied to port 1 and half of the power is coupled to port 2 while the other half is passed directly to port 3. The remainder of the diplexer connected to port 2 is called the "coupled line" and is identified by the reference character 6, and the part connected to port 3 is called the "direct line" and is designated 7. Ports 2 and 3 are connected through equal electrical lengths of transmission line to filters 8 and 8', respectively, having substantially identical pass band characteristics as shown in FIGURE 3. The filters may be low-pass, band-pass, or high-pass filters, but for illustrative purposes are described hereinafter as low-pass filters. The outputs of the filters are applied to a differential phase shifter 10 and pass to ports 11 and 14, respectively, of second hybrid 15. Port 13 of hybrid 15 is terminated in load 16.

Conventional hybrid filter diplexers divide an input signal into two frequency bands within the half-power bandwidth of the hybrid. If frequency bands of equal breadth are desired, low-pass filters having a cutoff frequency equal to the mid-band frequency of the half-power bandwidth of the hybrid, $f_3$ in FIGURE 2, are employed. An input signal having a frequency less than the mid-band frequency is passed to one port of the second hybrid and an input signal having a frequency greater than the mid-band frequency is reflected into the input hybrid.

Hybrids 5 and 15 divide signal power equally over a frequency band denoted as $f_2$ to $f_4$ in FIGURE 2 and divide the power unequally for signals whose frequency is greater than $f_4$ or less than $f_2$. Filters 8 and 8' are low-pass filters having a cutoff frequency denoted as $f_2$ in FIGURE 3.

An input signal ($V_1\angle 0°$) having a frequency between $f_2$ and $f_4$ and applied to port 1 of hybrid 5 divides equally between ports 2 and 3. The electrical vector of the signal coupled to port 2 is reduced to 0.707 of its value and is in phase with the input signal in port 1, and the electrical vector of the signal in port 3 is factored by 0.707 and has a phase angle of −90 degrees relative to the signal in ports 1 and 2. It should be noted that diplexer components (hybrids, filters, differential phase shifter) having equal phase delays and lines having equal electrical length are ideally employed in coupled line 6 and direct line 7. Compensation for deviation from this idealized condition is accomplished by adjustment of the amount of phase shift in differential phase shifter 10. Particular phase shifts introduced by the transmission lines and components are not included in the following discussion. Consideration of these phase shifts will alter the absolute phase at points in the circuit, but will not change the relative phase such as that between signals in ports 2 and 3 of FIGURE 1.

Signals at ports 2 and 3 which are in the rejection bands of filters 8 and 8' are reflected into hybrid 5. The signal ($0.707\ V_1 \angle -90°$) reflected into port 3 divides equally between ports 4 and 1. The electrical vector of the signal coupled to port 4 is reduced to 0.707 of its value and has a phase angle of −90 degrees relative to the input signal in port 1. The signal in port 1 is factored by 0.707 and has a phase angle of 180 degrees relative to the input signal in port 1. Similarly, the signal ($0.707\ V_1 \angle 0°$) reflected into port 2 is divided equally between ports 1 and 4. The electrical vector of the signal coupled to port 1 is factored by 0.707 and is in phase with the input signal to port 1. The electrical vector of the signal in port 4 is reduced to 0.707 of its value and has a phase angle of −90 degrees relative to the input signal in port 1. The reflected direct and coupled signals in port 1 cancel because they are of equal magnitude and are 180 degrees out of phase. The signals in port 4 are of equal magnitude and are in phase and combine to produce an output in port 4 having a frequency between $f_2$ and $f_4$ (the half-power bandwidth of the hybrid), a power substantially equal to the input signal, and a phase angle of −90 degrees relative to the input signal in port 1.

An input signal to port 1 of hybrid 5 having a frequency outside the half-power bandwidth of the hybrid, for illustrative purposes, less than the frequency $f_2$ of FIGURES 2 and 3, does not divide evenly between ports 2 and 3. The electrical vector of the signal coupled to port 2 is reduced to a value equal to the product of the electrical vector of the input signal and the voltage coupling factor $k$ and is in phase with the input signal to port 1. However, the electrical vector of the signal in port 3 is the product of the electrical vector of the input signal and the factor $\sqrt{1-k^2}$ and has a phase angle of −90 degrees relative to the input signal to port 1 and the signal in port 2. Since the signal into ports 2 and 3 are in the pass band of filters 8 and 8', they are passed to differential phase shifter 10 which alters the relative phase of the signals so that the signal in direct line 7' leads the signal in coupled lines 6 and 6' by 90 degrees. Thus, the relative phase of the signal into port 11 of hybrid 15 has a phase angle of −90 degrees with respect to the signal into port 14, the electrical vector of the signal into ports 11 and 14 being $kV_1\angle 0°$ and $\sqrt{1-k^2}V_1\angle +90°$, respectively.

As in hybrid 5, the signals into ports 11 and 14 of hybrid 15 divide unequally between ports 12 and 13. The electrical vector ($kV_1\angle 0°$) of the signal into port 11 coupled to port 12 is factor by $k$ and is in phase with the signal in port 11 whereas the electrical vector of the signal passed to port 13 is factored by $\sqrt{1-k^2}$ and has a phase of angle of −90 degrees relative to the phase of the signal in port 11. Similarly, the electrical vector ($\sqrt{1-k^2}V_1\angle +90°$) of the signal into port 14 and coupled to port 13 is factored by $k$ and has a phase angle of +90 degrees with respect to the signal in port 11 whereas the electrical vector of the signal passed to port 12 is factored by $\sqrt{1-k^2}$ and has a phase angle of 0 degree with respect to the signal in port 11. The signals and electrical vectors [$k^2V_1\angle 0°$ and $(1-k^2)V_1\angle 0°$] in port 12 are in phase and combine to produce an output from port 12 that is in phase with and has a power substantially equal to the input signal to port 1 of hybrid 5. The coupled and direct signals and electrical vectors ($k\sqrt{1-k^2}V_1\angle +90$ and $k\sqrt{1-k^2}V_1\angle -90$) in port 13 cancel because they are of equal magnitude and 180 degrees out of phase with each other. Thus, an output whose frequency is within the bandwidth of the hybrid is obtained from port 4 of hybrid 5 and an output whose frequency is outside the frequency band of the hybrid is obtained from port 12 of hybrid 15 and a diplexer having a bandwidth greater than the bandwidth of the hybrid is obtained.

As many modifications of this invention can be made without departing from its true spirit, the scope of this invention is to be determined from the appended claims and not from the specific embodiment described herein.

What is claimed is:

1. A hybrid-filter frequency branching network having a bandwidth greater than the half-power bandwidth of the hybrids, said network comprising first and second substantially identical 90° four port hybrid couplers each having a pair of terminals on opposite sides thereof and providing over the hybrid half-power bandwidth substantially equal coupling of a signal input to any one of said terminals to each of the terminals on the opposite side of the hybrid and providing outside the hybrid half-power bandwidth for coupling to the opposite terminal substantially $k$ times the signal input and to the other coupled terminal substantially $\sqrt{1-k^2}$ times the signal input, a pair of substantially identical filters each having an input and an output terminal, a frequency limit defining the rejection band of said filters being immediately adjacent to a frequency limit of the half-power bandwidth of the hybrids, means for connecting said filter input terminals to a pair of terminals, respectively, on one side of said first four port hybrid coupler, and a differential phase shifting network having a first pair of terminals connected to said filter outputs, respectively, and a pair of terminals connected to one of said pair of terminals, respectively, on one side of said second four port hybrid coupler, said differential phase shifting network being adapted to shift the phase of a signal applied to one terminal of one pair of said differential phase shifting network terminals relative to the other terminal of said pair by approximately 180°.

2. A hybrid-filter frequency branching network having a bandwidth greater than the half-power bandwidth of the hybrids, said network comprising first and second substantially identical 90° four port hybrid couplers each having a pair of terminals on opposite sides thereof, a pair of substantially identical filters each having an input and an output terminal, the rejection band of each of said filters being within the half-power bandwidth of the hybrids, means for connecting said filter input terminals to a pair of terminals, respectively, on one side of said first four port hybrid coupler, and a differential phase shifting network having a first pair of terminals connected to said filter outputs, respectively, and a pair of terminals connected to one of said pair of terminals, respectively, on one side of said second four port hybrid coupler, said differential phase shifting network being adapted to shift the phase of a signal applied to one terminal of one pair of said differential phase shifting network terminals relative to the other terminal of said pair by approximately 180°.

References Cited by the Examiner

UNITED STATES PATENTS

| | | | |
|---|---|---|---|
| 2,531,419 | 11/1950 | Fox | 333—11 |
| 2,639,326 | 5/1953 | Ring | 333—11 |
| 2,795,763 | 6/1957 | Tillotson | 333—11 |
| 2,938,084 | 5/1960 | Autrey | 333—11 |

OTHER REFERENCES

Marcatili et al.: "Broad-band Directional Couplers," IRE Transactions on Microwave Theory and Techniques, vol. MTT–10, No. 4, July 1962, pp. 251 to 257.

ELI LIEBERMAN, *Acting Primary Examiner.*

G. TABAK, *Assistant Examiner.*